US006366281B1

(12) United States Patent
Lipton et al.

(10) Patent No.: US 6,366,281 B1
(45) Date of Patent: Apr. 2, 2002

(54) SYNTHETIC PANORAMAGRAM

(75) Inventors: Lenny Lipton, Greenbrae; Steve Andersen, Mill Valley; Dave Milici, San Francisco, all of CA (US)

(73) Assignee: Stereographics Corporation, San Rafael, CA (US)

(*) Notice: Subject to any disclaimer, the term of this patent is extended or adjusted under 35 U.S.C. 154(b) by 0 days.

(21) Appl. No.: 09/319,428

(22) PCT Filed: Dec. 5, 1997

(86) PCT No.: PCT/US97/22378

§ 371 Date: Aug. 13, 1999

§ 102(e) Date: Aug. 13, 1999

(87) PCT Pub. No.: WO98/27456

PCT Pub. Date: Jun. 25, 1998

Related U.S. Application Data

(60) Provisional application No. 60/032,146, filed on Dec. 6, 1996.

(51) Int. Cl.⁷ .............................................. G06F 15/00
(52) U.S. Cl. ..................................................... 345/419
(58) Field of Search ................................ 345/419, 427, 345/426, 428, 606, 607

(56) References Cited

U.S. PATENT DOCUMENTS

| 5,455,689 A | 10/1995 | Taylor et al. ............... 358/450 |
| 5,519,794 A | 5/1996 | Sandor et al. ............... 382/285 |
| 5,613,048 A | 3/1997 | Chen et al. ................. 395/119 |
| 5,757,546 A | 5/1998 | Lipton et al. ............... 359/464 |
| 6,292,194 B1 * | 9/2001 | Powell, III .................. 345/430 |

OTHER PUBLICATIONS

Leonard McMillian et al., "Plenoptic Modeling: An Image-Based Rendering System," ACM, Computer Graphics and Proceedings, Aug. 1995, pp. 39–46.

A. Appel et al., "Computer Generation of 3D Pictures," IBM Technical Bulletin, vol. 15, No. 3, Aug. 1972, pp. 834–839a.

* cited by examiner

Primary Examiner—Phu K. Nguyen
(74) Attorney, Agent, or Firm—Dergosits & Noah LLP

(57) ABSTRACT

A method for synthesizing multiple intermediate view images from a pair of planostereoscopic source images. The source images have different perspective views which are spaced apart in a horizontal plane. Control points are defined at corresponding locations in the source images, and each control point includes position and color information. Intermediate images are created as transformations of the source images by "morphing" from one source image to the other using position and color information from each of the corresponding locations. In a panoramagram embodiment, the intermediate images and the source images are then interdigitated to create a single output image with a continuum of views ranging from one source image to the other source image.

15 Claims, 2 Drawing Sheets

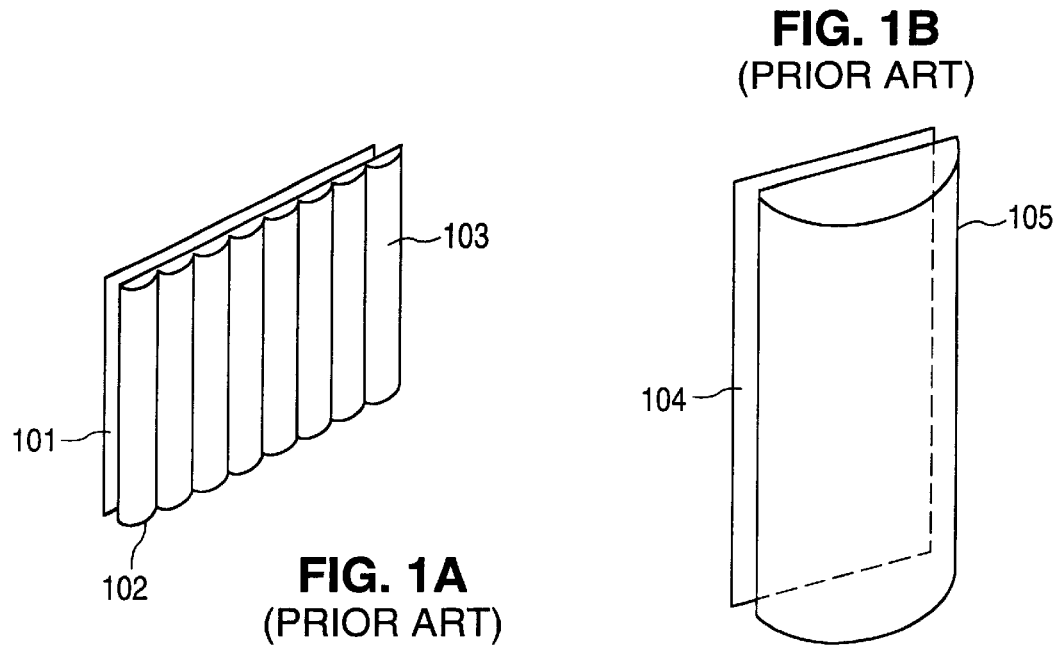
FIG. 1A
(PRIOR ART)
FIG. 1B
(PRIOR ART)
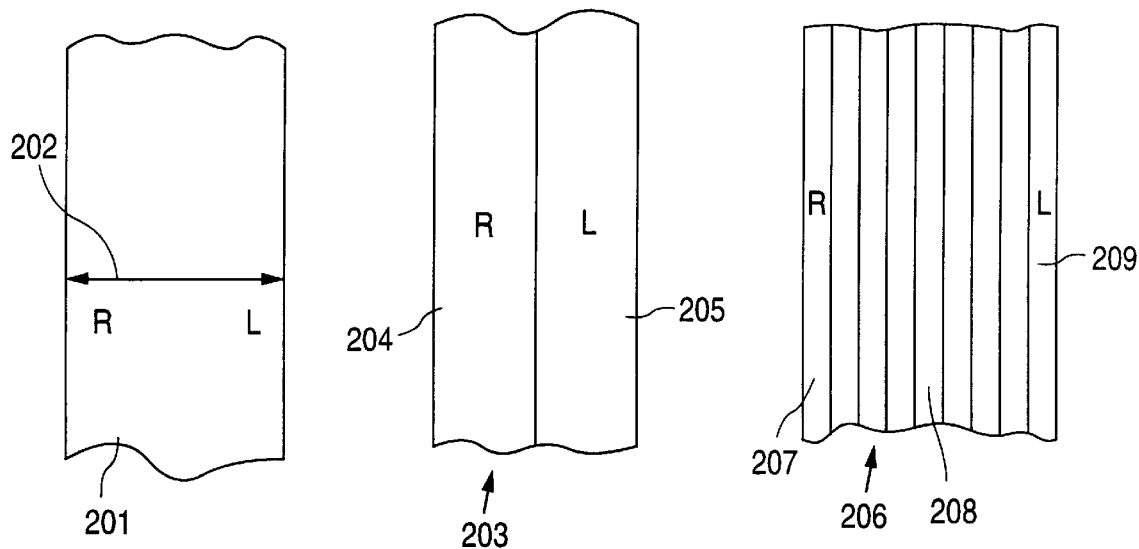
FIG. 2A
(PRIOR ART)
FIG. 2B
(PRIOR ART)
FIG. 2C
(PRIOR ART)

SYNTHETIC PANORAMAGRAM

This application claims benefit of provisional application 60/032,146, filed Dec. 6, 1996.

FIELD OF THE INVENTION

The invention is an lenticular stereogram and a method for making the same which provides full panoramagram capability from a stereo pair.

BACKGROUND OF THE INVENTION

There is a substantial prior art in the patent and other literature discussing parallax panoramagram or lenticular stereogram technology. It is not our intention to provide a thorough review of the prior art, but rather to provide a background sufficient to orient one skilled in the art enough to fully appreciate the present disclosure.

Image selection, as Ives has stated, must take place at either the surface of the display or the eyes of the viewer. If the former, then an infinite number of views is required if the image is to be viewed from any location in front of the display. If the latter, then only two views are required. In practice, the interdigitated panoramagram, which is the most practical version of the art under discussion, uses only a handful of images, which may or may not provide acceptable image quality. See L. Lipton, "The Future of Autostereoscopic Electronic Displays", SPIE Conference Proceedings #1669.

Initial panoramagram cameras provided optical or mechanical means, with either a moving slit or lenticular array, to create a continuum of views within each image column, but the precursor of the panoramagram, the interdigitated parallax stereogram, used sliced and alternated left and right images of a stereopair. This array may be viewed either through a raster barrier (which resembles a Ronchi grating) or an overlaid lenticular surface. In the case of the lenticular method, each lenticule covers an interdigitated set of images, or one column. For either the barrier or lenticular method, image selection is provided more or less at the plane of the display, and there is no requirement for individual viewing devices or eyewear. The lenticular screen typically has a surface of corduroy-like semi-cylindrical elements or lenticules, and has for the most part supplanted the raster barrier because it has much greater light transmission, and because stereo viewing zones are much larger than unwanted pseudo viewing zones.

The term "continuum" as used herein is an approximation in fact due to resolution limitations in any imaging medium or lens system, but the term is more descriptive of the methodology of imaging since no after-the-fact combination is required of separately photographed views. The major benefit of this approach, however derived, is that the observer has relatively good freedom of head placement and can see a stereoscopic image over a broad angle of view.

The interdigitated stereogram, on the other hand, requires exact placement of the eyes in a particular location, and if the head of the observer moves ever so slightly, a pseuodoscopic rather than a stereoscopic image will be seen. The parallax panoramagram is an improvement over the interdigitated parallax stereogram in that it allows for more freedom of view location with respect to the display since quite of bit of head movement is possible. The parallax panoramagram, by incorporating a continuum or multiplicity of views, allows for a wider horizontal angle of view of the display. As previously stated, these cameras are able to produce such a continuum by various means. (The vertical angle of view is not at issue since the lenticular screen is refractive only in the horizontal plane, and head movement up and down does not alter the stereoscopic effect.)

The panoramagram requires a time exposure in some embodiments. The temporally derived spatial parallax information which is captured during the exposure is transformed into the required spatial parallax information. As long as a time exposure is required, certain applications and the ability to shoot many types of subjects are limited. Moreover, panoramagram cameras are complex and costly instruments. Thus, inventors sought means to simplify the panoramagram process and preserve its best quality, namely that the image is more easily viewed than the more primitive interdigitated stereogram.

In a clever variation of the two view interdigitated stereogram, inventors created means to interdigitate a multiplicity of views, in some embodiments captured simultaneously with a number of cameras suitably spaced along a horizontal base. Resembling the interdigitated stereogram, the interdigitated panoramagram neatly attempts to combine the best aspects of both techniques. An array of cameras facing the subject is used to simultaneously photograph the subject, and the images are combined optically or with the aid of a computer to produce the necessary columns of information. In some cases, a single camera is preferred for shooting still-life images, and it is slid along a bar for successive exposures.

It should be noted for clarity that the literature of silver-based photographic panoramagraphy uses the term "interdigitate" to describe the laying down of multiple perspective stripes of images within a column. However, computer graphics people often describe this process as "interleaving," which is an unfortunate term because it is easily confused with the term "interlacing," which is widely used to describe electronic displays but with an entirely different meaning.

The panoramagram and its variants have over the years been used for many applications, such as portraiture, advertising, product packaging and magazine reproduction. The technology has also been used for mass consumer snapshot applications with cameras using only three or four lenses.

In the past decade or so, products for snapshots have appeared using the interdigitated concept, but using only three or four lenses or views. While better than a interdigitated stereopair stereogram, the result falls far short of a true panoramagram or a decent interdigitated panoramagram with regard to depth effect and viewing angle. Such products have not had a great deal of commercial success in the marketplace.

In addition to the needs of those requiring still images, viewed either as reflective prints or transparencies, there is also the need for autostereoscopic panoramagram technology as applied to motion picture and electronic imaging displays. The art was applied to movies in the former Soviet Union. Here, a raster barrier was used to view interdigitated stereograms, each view projected with its own lens. After about two decades, the process was abandoned because audiences preferred the polarizing method of image selection since sitting with the head held rigidly was uncomfortable for most people.

There have been some recent attempts to apply the art to electronic displays. The flat matrix type display panel would, at first, appear to be a good fit because of its ability to provide exact registration of an image element with respect to the lenticular screen optical elements. As it turns out, the commercially available products have been disappointing because of poor image quality and the constraint on viewer head placement, as mentioned above. One way to solve the later problem is to employ head tracking technology to shift columns to maintain a stereo rather than a pseudo effect. However, this technology is costly and can only work for a single observer at a time.

One of the most important potential applications of the art is for autostereoscopic television, or 3D TV, which may be viewed without eyewear. Laboratory demonstrations have shown that multiple video projectors projecting to the rear of a screen can be viewed from the front through a lenticular array. But even the use of eight or so projectors still results in severe limitations of observer head movement, and obviously requires a large bandwidth if each image requires its own channel.

One key to making such a television display practical might be to use an approach in which only a stereo pair of images is transmitted, and by some means at the TV set itself, create the additional views required for a true panoramagram display and its attendant benefits. A number of research papers, mostly by workers in Japan and Western Europe, have been presented on this topic. A review of the papers shows that limited success has been achieved, and it is far from certain that a promising approach will be forthcoming because the techniques employed require enormous computational effort. Although a receiver capable of synthesizing a panoramagram out of a stereo pair will require both image storage and powerful computation ability to accomplish on-the-fly synthesis, more progress will have to be shown on the algorithmic level.

As we have seen, there are significant limitations in the prior art. Progress from the interdigitated stereogram to the panoramagram, and then to the interdigitated panoramagram, is significant. However, production of still images with a multiple camera/lens array is not practical for many applications such as consumer snapshot applications or motion picture cinematography. In addition, there are many workers using field sequential stereo displays on computer workstations (for example, for scientific visualization) and viewing the display with shuttering eyewear, and these workers have a need for hard copy.

There is no question that a continuous approach, as illustrated in terms of individual columnar structure, is far superior to any other method in terms of ease of viewing and depth effect. Thus, it would thus be highly desirable to produce a full panoramagram effect from a stereopair, since the aforementioned applications would become practical. There would be no need for a multiple lens/camera array and the ensuing complications for still photography. It is furthermore clear that the usual panoramagram is not a practical solution for motion pictures, which would preferably be carried out with at most two cameras for the production of a stereo pair. Moreover, projection would then be most conveniently carried out with but a single projector.

SUMMARY OF THE INVENTION

The present invention includes a panoramagram and a method for making the same from a pair of planostereoscopic source images. The pair of source images are, for example, a left image and a right image having different perspective views which are spaced apart in a horizontal plane. The left image may be considered the starting image and the right image the ending image, or vice versa. Control points are defined at corresponding locations in the source images, and each control point includes position and color information. A plurality of intermediate images are created by "morphing" from the starting image to the ending image using position and color information from each of the corresponding locations. Preferably, the morphing process involves creating transformations of the source images based on the physical proximity from each control point; in other words, the transformation is affected strongly by control points which are nearby and is less affected by control points which are far away. The intermediate images and the source images are then interdigitated to create a single output image with a continuum of views ranging from the left image to the right image.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

FIG. 1A is a perspective view showing a lenticular screen and a display surface in intimate juxtaposition according to the prior art.

FIG. 1B is a perspective view of an individual lenticule and its associated image column according to the prior art.

FIGS. 2A, 2B and 2C are plan views of a classical stereo continuum panoramagram, an interdigitated stereopair panoramagram, and a multiple view interdigitated panoramagram, respectively, all according to the prior art.

DETAILED DESCRIPTION OF THE PREFERRED EMBODIMENT

Figure 3:
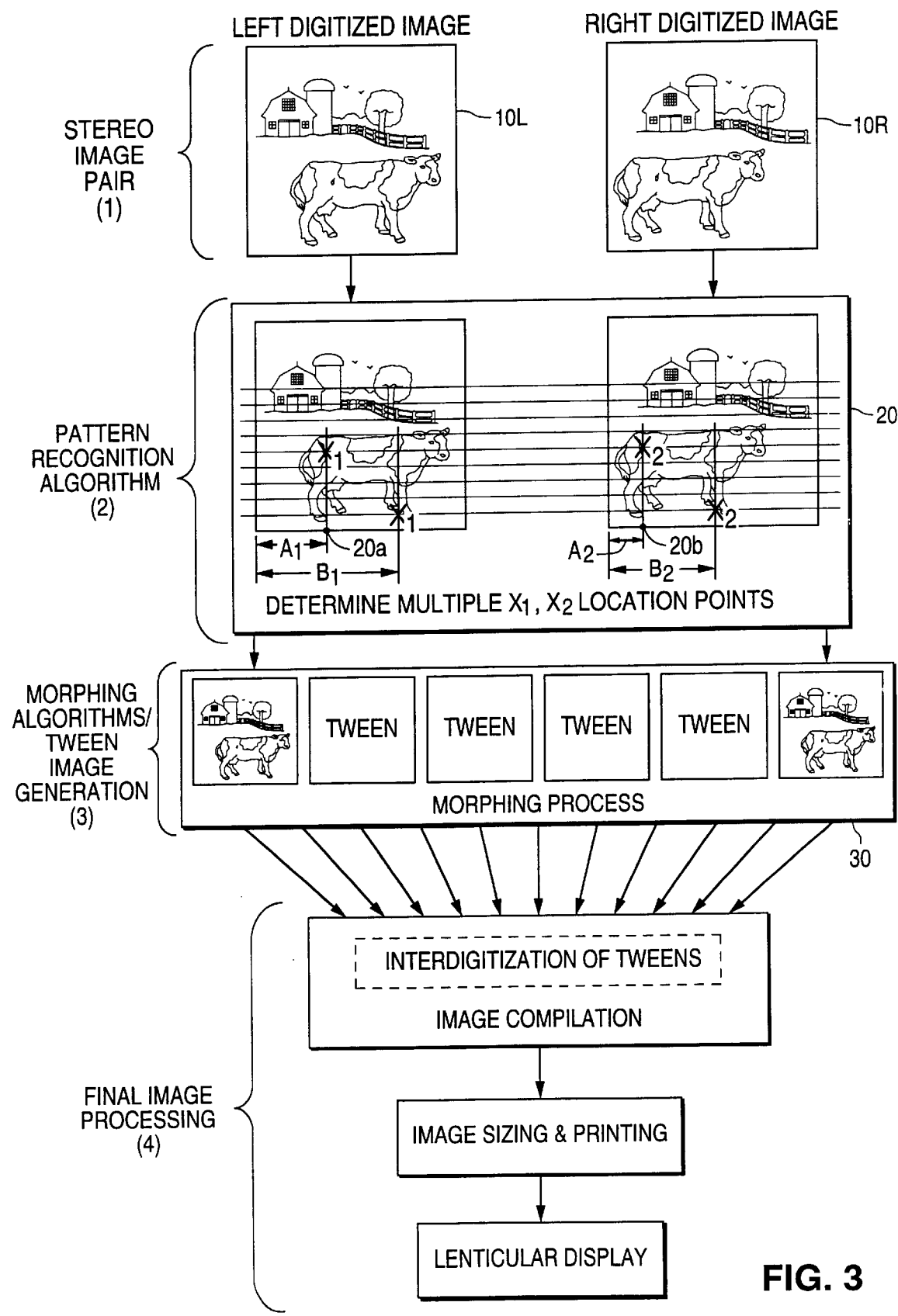
FIG. 3 illustrates the process flow for creating a synthetic panoramagram in accordance with the present invention.

The object of this invention to create a continuous panoramagram synthetically from just two views, namely a left view and a right view. By beginning with an ordinary stereopair, it is our goal to produce the same excellent depth effect that has been available, until now, only by means of the classical panoramagram. The taking of a panoramagram image is difficult and has heretofore been limited in its application to static images.

In addition, we have achieved the ability to create not simply an interleave or interlaced effect, but rather the continuous panoramagram effect, which has vastly superior image quality.

There are two independent but related parts of the disclosure. One relates to the ability to begin with a stereo pair and to produce from that pair of images the interdigitated panoramagram. The second innovation relates to software method for taking these individual interdigitated elements and turning them into the continuum needed to produce an intrinsic panoramagram.

FIG. 1A shows a typical lenticular sheet 103, which is made up of individual lenticules 102 arranged in intimate juxtaposition with a display surface 101. The display is arranged in columns, as shown in FIG. 1B, wherein column 104 is viewed through lenticule 105. Each column has a recording of perspective information with the left image information on the right side of the column and vice versa, as illustrated in FIGS. 2A through 2C. This inversion of left and right results from the optics of the lenticular screen.

With reference to FIG. 2A, column 201 illustrates the intrinsic panoramagram which uses a recording of a continuum of views, as represented by a horizontal line of pixels 202. The resolution of pixel density along this horizontal line determines the number of individual views which may be recorded in a column and thus viewed through a lenticule.

With reference to FIG. 2B, the column 203 is divided into two image stripes, namely the right perspective view 204 and the left perspective view 205. This is the structure of an interdigitated parallax stereogram. It has the limitation described in the Background section above and requires exact placement of the observer with respect to the display surface.

FIG. 2C is an interdigitated panoramagram constructed out of many views, with column 206 including right extreme view 207, middle view 208 and left extreme view 209. Although superior to the interdigitated stereogram shown in FIG. 2B in terms of head movement, the observer will still be aware of discrete "flips" or discontinuities because of the discrete nature of the image structure.

FIG. 3 shows the steps used to create a synthetic panoramagram in accord with the present invention by using any stereo pair as the source. Processing is presented into four basic stages, namely (1) image preparation, (2) pattern recognition, (3) morphing and (4) interdigitating.

A brief overview of the inventive technique follows. Stereo image pair preparation (1) is the standard means for creating plano-stereo images (two view images which are synthesized by the mind into an image with binocular stereopsis) for any medium, such as silver-based photography, digital photography, or computer generated images. For example, one can start with digitized left and right stereo files 10L and 10R in a Windows Bitmap (BMP) 24 bit RGB format. If files are in any other format, convert as outlined using any off-the-shelf image program, such as Photoshop, Photosyler, or Picture Publisher. Make alignment adjustments (rotation and vertical) as you would for viewing stereo images with any medium. Set the window following the basic rules as outlined in the StereoGraphics Developers Handbook, Chapter 3: Composition, available on the internet at www.stereographics.com.

Pattern recognition (2) can be accomplished in two ways, either by means of a pattern recognition algorithm as illustrated in block 20, or by manually selecting similar location points in the digitized stereo pair using an off-the-shelf morphing program. Morphing, or "transition morphing" as it is called in .this case, is the transformation of an image to form a new image using position and color information from both source images. One defines control points in each image such as start point 20a and end point 20b. These two control points specify an exact amount of movement for the point of the image which is exactly under that particular control point. Areas of the image which are not directly underneath a control point move in such a way as to agree with all the control points nearby; the closer a control point is to a portion of the image, the more the image will move in a manner similar to the motion of that point. Control points which are very far away from a location on an image will have little or no effect on that location.

The term color information as used herein is fully intended to encompass monochrome data, such as image density information.

Morphing (3) is the generation of a sequence of images to provide a continuous change from one image to the other, such as illustrated in block 30. Determining the proper number of views for a particular lenticular screen usually is dictated by the physical width of a lenticule (1/pitch), that is, how many printed pixels will actually fit under a lenticule. It is possible to improve the quality of depth and field of view by increasing the number of views, applying an algorithm that averages the x number of views, and resize the x number of views to place under the lenticule.

Next, the step-by-step method we have used is given in some detail explaining the exact combination of techniques used to make a print to be viewed with a lenticular screen using any stereo pair as the source.

Stage 1—Image Preparation

The first four steps prepare images for the morphing process and are conventional for preparing stereo images for any medium.

Step 1. Start with digitized left and right stereo files. A TIFF (Tagged Information File Format) format is preferably be used, and converted to RGB. If files are in any other format, they may be converted using any suitable image program, such as Photoshop, Photosyler, or Picture Publisher. One must be sure to use the same image program to convert both the left and right image files because different image programs can save files with different header information which will corrupt the interdigitation process.

Step 2. Make alignment adjustments (rotation and vertical) as one would for viewing stereo images with any medium, for example, using the Photoshop program. Picking similar X,Y points on each of the left and right image files will provide a good reference for calculating the amount of correction required for both vertical and rotational adjustment. It is best to adjust rotational error first, then vertical alignment second.

Step 3. Set the window or zero parallax point by horizontally shifting the images with respect to each other following the basic rules as outlined in the StereoGraphics Developers Handbook, Chapter 3: Composition. The Photoshop program may be used to get an X,Y point on each file of the object that will be placed "at the window," then crop each file to match the selected X,Y points.

Step 4. Image resizing is predetermined by the number of views to be made. For example, if 20 views are used for a lenticular presentation, then the width of each image file must be divisible by 20. A good working size is between 1000 and 2000 pixels wide maintaining the proper aspect ratio for the height. As an example, suppose the image files are 3023 pixels wide by 2267 pixels high after making alignment adjustments and setting the window, and one wants 20 views for a lenticular print. Using the Photoshop program, load the left image file, select Image, Image Size dialog, type in 2000 pixels (divisible by 20) in the width box and press OK. Photoshop will maintain the proper aspect ratio for the height (1500 pixels) if the proportions box is checked. Then do the same for the right image file. Save the files. The left and right image files are now ready for the morphing process.

Step 5 (optional). Using Photoshop, duplicate left/right images and apply an edge/invert filter to each image to define distinguishing landmarks and edges for a more accurate point selection in the morphing process. This process only works on rather high contrast images and proves less effective with low contrast or monotone images.

Stage 2—Morphing

As previously mentioned, morphing is the transformation of one or both images to form a new image, using position and color information from both source images. Positional control may be determined by manual placement. Morphing is the generation of a sequence of images to provide a continuous change from one image to the other. One places control points, which actually consist of two elements, namely start and end points. These specify an exact amount of movement for the point of the image which is exactly under that particular control point. Areas of the image which are not directly underneath a control point move in such a way as to agree with all the control points nearby; the closer a control point is to a portion of the image, the more the image will move in a manner similar to the motion of that point. Control points which are very far away from a location on an image will have little or no effect on that location.

There are several off-the-shelf morphing programs available which can adequately perform this task, for example, Elastic Reality and WinImages:Morph. The latter program has the distinct advantage since it builds a separate ASCII file with the start/end control points as X,Y position relative to a master grid. This file could be built by other programs, such as a pattern recognition program (PRP) to automate the control point selection. It is our expectation that this process can be automated by use of such PRP techniques, to be applied to our process at some future time. We describe the morphing process using WinImages:Morph for the conversion of stereo image pairs to lenticular output.

Step 6. In order to create a transition morph, the left image is loaded as the start frame and the right image is loaded as the end frame. For example, if the stereo image pair is a portrait scene, there will be two color image views, one of the start image and one of the end image. These two image views act like any other window in that they can be re-sized and re-positioned to best suit specific needs. These images are used as a guide in placing the control points.

Step 7. Re-position the start frame to the right on the screen and the end frame to the left on the screen. This allows cross-viewing of the stereo images when selecting control points. It is not necessary for selecting all control points, but some points are difficult to place without the cross-viewing technique.

Step 8. Select the Sequence Controls option in the Generate menu. When the dialog opens, check the text entry field marked Total Frames. If it does not read the value 20, then click in this field with the left mouse button and replace whatever was there with 20. (For this example we are using 20 to be consistent with our file width of 2000 pixels.)

Determining the proper number of views for a particular lenticular screen is usually dictated by the physical width of a lenticule, that is, how many printed pixels will actually fit under a lenticular lens. Experience has shown it is possible to improve the quality of depth and field of view by increasing the number of views, applying a algorithm that averages the x number of views, and resize the x number of views to place under the lenticule. More on this in Stage 3.

Step 9. Zoom in on the working area for the left eye. To zoom, first click on the zoom button located in the top right-hand corner of the morphing panel. Notice that the normal WinImages pointer will change into the shape of a magnifying glass. Now point the zoom pointer about ½ inch above and to the left of the left eye (start image), click and hold the left mouse button and drag the mouse down and to the right. A box will appear; keep pulling until the box entirely encloses the eye (about ½ inch below and right) and then let go of the mouse button. The box can be repositioned by pressing the right mouse button in addition to the left. The image will now be zoomed in.

If the result is not pleasing, click on the dezoom button and the zoom will be turned off. Repeat these steps, beginning with re-selecting the zoom button, to get a better zoom around the eye. When the eye is nicely centered in a zoomed image, continue. The image in the right (end) view will need to be zoomed also. Follow the steps above to zoom around the left eye in the end image view.

Step 10. Select the point tool from the tool box, then point at the eye of the start image and drop points all around the edge of the eye (about 8 points should be just fine). Preferably, the points are placed as follows; one at each corner of the eye; one directly above, and one directly below the pupil; and the final four, one at a time between the corners of the eye and the points by the pupil.

Step 11. Looking at the end image, the same points will be visible, but they will not be correctly arranged around the end image's eye because they are in different X positions due to placement of the window and the fact they are different views of the same object. In the manual process, those points must be arranged in the same manner around the other eye. Obviously, the points should be in the same relative positions as they are in the left frame. Point and move the points in the right frame by right clicking on a point and then moving it into position. If one has the ability to cross-view the images, one can place a control point correctly by using depth cues. If the need exists to adjust any of the points in the start image view, right click on the desired point and move it to its new position. Adding more points will dramatically improve the details in the morphing process.

Step 12. Continue as outlined in steps 9 through 11 on other regions of the image until all portions of the image are covered with control points.

Step 13. Save the project. This step will generate two files, a project file with image names and directory locations, and a control point ASCII database listing all the X,Y coordinates of the start frame and end frame.

Step 14. Select the Sequence Controls option in the Generate menu. This is where the user sets the working parameters for the morph. These include resolution, output format, and number of frames. The descriptions below detail all of these dialog controls.

Total frames: The total number of frames in the morph, set to 20 in this example.

Begin Frame #: The frame number where morphing will begin for a sequence generation. Set to 1.

Finish Frame #: The frame number where morphing will finish for a sequence generation. Set to 20.

Current Frame #: The frame that will be created when "Do one Frame" is selected. For example, if Total Frames is set to 20, a Current Frame of 10 will generate the middle frame, half way between the Begin and Finish frames. If you then set Begin Frame to 1 and Finish Frame to 20, all the frames of the morph animation will be generated.

Anti-Alias: Anti-aliasing affects the spatial (or positional) accuracy of the morph result in distances less than one pixel width. This should be switched on for the best quality result.

Save Result: When a morph frame is generated, this switch tells the program to automatically save the resulting image. The files will be saved in the format specified in the Save File as Type option found in this dialog. Set to TIF format.

Output file: The file name that will be used when the morph result is automatically saved.

Specify: This opens a file requester to locate a valid path and file name for the output file. The last four characters of the file name (before the extension) will be replaced with the frame number (0001 to 9999). For example, a file having the name C:\IMAGES\MYIMAGE.TIF will be changed to C:\IMAGES\MYIM0007.TIF for frame seven.

This requester also contains all of the output file information, including format, Color Depth, Compression, and output path and file name. Morph will automatically alter the output file format if you change the extension of the image name.

Save File as Type: This drop down box allows you to select the output file format for a sequence of morph frames.

Changing the save type will also change the save options (Color Depth, Compression, and JPEG Quality) that are available. For example, if you select BMP as the output format, you would be able to select a 24 bit, 8 bit, 4 bit, or 1 bit render Color Depth for that format.

Output size: This is the resolution of the results of morph creation. It is the main determinate of the output quality. This should be set to match the original size of the left/right image.

Match Start Aspect Ratio: Matches the output size to the ratio of dimensions of the Start Frame.

Match End Aspect Ratio: Matches the output size to the ratio of dimensions of the End Frame.

Set to Start Frame size: Matches the output size to the exact dimensions of the Start Frame.

Set to End Frame size: Matches the output size to the exact dimensions of the End Frame.

Step 15. Select the Sequence Generate option in the Generate menu. This generates an entire sequence of morph frames. The extent of the sequence was specified in the Sequence Controls and usually goes from Frame #1 to the last frame (which equals the Total Frames value set in the Sequence Controls). If the Save Result option was set in the Sequence Controls, then each frame will be saved as it is generated.

Stage 3—Interdigitating Process

We have developed a program which vastly speeds up the task of interdigitating the multiple views. In our preferred embodiment, the program is written in C language and executed on a Pentium-based personal computer with Windows NT operating system. A copy of the program is set forth in Exhibit A. The program is so much faster than prior art methods that one may use a computer of ordinary capability rather than one of extraordinary performance. We have found the program given here produces lenticular stereograms free from disturbing artifacts which detract from the three-dimensional effect. In addition, it is desirable to use the program to compute more views than calculation predicts can be resolved behind each lenticule. By this means we have achieved the continuous panoramagram effect, as opposed to the interleaved effect, which has noticeable visual jumps as one moves his or her head within the acceptable viewing zone. Moreover, the stereoscopic effect of our new technique is much deeper, and there is much less blurring of image points away from the zero parallax point, a common complaint reported in the literature.

For example, if calculation predicts that the pixel limit along a horizontal line within a column is 20, we find that by providing at least 30 views but not more than 80, we have achieved the continuous panoramagram effect with its attendant benefits. Experience has shown that between 1.5 and 4 times the number of pixels predicted as the resolution limit will have the beneficial effect sought.

In addition, the method described here has the benefit of providing a final image output to any print size with any number of views of almost any size, thus providing a wider range of print size choice. Additionally, a special border is calculated and added to the final output for the purpose of precision alignment under a lenticule.

The program reads any number of bitmap views, vertical line by vertical line, adds additional border lines, and places the extracted data homogeneously into an anamorphic sized output file.

If the calculations require the anamorphic file to be larger than the total sum of the vertical lines extracted from the total views, a process of stretching is applied. Stretching is the process of adding "holes" evenly across the anamorphic file, then filling the holes with average interpolated pixel data.

If the calculations require the anamorphic file to be smaller than the total sum of the vertical lines extracted, then vertical lines are "dropped" homogeneously across the anamorphic file.

Advantageously, the image data can be handled one scan line at a time. Vertical lines from each of the views can be extracted in two methods. Under the first method, all vertical lines are extracted from the same pixel position of every view. The second method extracts vertical lines from every view sequentially within a given "block." A block is calculated as (number of views*lens pitch*print inches)/(number of views). Either method will give the desired result once placed under the lens, but the raw data will look quite different, especially that image information in the area where the stereoscopic information is "at the stereo window," or at the "zero parallax point." The anamorphic file is then resized to the proper final size using an average interpolation algorithm.

Step 16. Add special border to views for alignment purposes. We add a black border to the first two images and a white border to the rest.

Step 17. Interdigitate the views and make one file for output to printer. Interdigitating may be accomplished using conventional programming methods. We have developed a suitable interdigitating program using a Visual Basic program, a C++ program, and the Photoshop program, as shown in Exhibit A. The basic process involves resizing each view based on number of views, grabbing a vertical line from each view and placing it in the final output file, and resizing the output file for proper output.

We have described in this disclosure means for producing lenticular stereograms of the panoramagram type from a traditional stereo pair of images. The means we have are given with exacting specificity and detail, and because of this we caution that others may find related means to achieve the same effect, and we remind the reader that the fundamental principals are of importance in disclosing our invention. Others skilled in the art may uncover useful variations, but only after having been apprised of the basic technique.

The invention may be applied to so-called hard copy of the reflective or transmissively illuminated types, and it may be applied to slide and motion picture projection. In addition, it may be used as a bandwidth conserving technique when applied to electronic imaging, such as television and computer graphics, and there may be display applications we have not imagined.

Although the technique has been described in terms of display with a lenticular screen, only a portion of the techniques given herein relate specifically to that selection medium. Autostereoscopic displays in general depend on having multiple images viewed in conjunction with some type of selection device, such as a lenticular screen. The basic morphing technique for synthesizing multiple views may be applied to other selection techniques using various raster and lens arrangements, for hardcopy, projection, computer graphics display, or video. Indeed, the technique has important applications in holography since at last, a stereo pair produced with a conventional two lens stereoscopic camera may be used to produce the information required in a holographic display. Further, the technique for handling image data one scan line at a time provides a significant advantage in speed of processing the data, and therefore has obvious applicability to real-time data processing. For example, the pixel transfer process will generally be done in an ascending order which can be readily corresponded using computer techniques to real time processes.

It should be understood that the invention is not intended to be limited by the specifics of the above-described embodiment, but rather defined by the accompanying claims.

EXHIBIT A

```
/*  Interdig.cpp
Interdigitation program for lenticular stereogram.
a program for reading BMP files line by line, (taking into account padding bytes
at end of each line and at end of file);
adding borders around them and interdigitating them into one anamorphic sized
output file, (while stretching (with avg. interpolation) or shrinking them); and
creating a final resized output file (with avg interpolation).
Vertical interdigitation results in the last input file
being the left-most column of each Block.
Horizontal interdigitation results in the first input file
being the top-most row of each Block.
All input files should be in the same directory as interdig.exe
and should be sequentially named starting with 001,
e.g., infi1001.bmp , infi1002.bmp , infi1003.bmp , etc.
As of this date there is only output for the anamorphic sized file (no final
sized output), and there is only vertical interdigitation.
The command line has 8 parameters:
     1st filename   only the chars up to the 001 need be entered e.g., if
                    "glor" is entered, infile is glor001.bmp
     NumViews
     printWidth_inches
     BorderSize_inches
     OutputDPI
     LensPitch
     NumBlackBorders
     Debug          - - 1 to output parameters, and program steps outside of
                    line generation
                    - - 2 to output parameters, program steps outside of line
                    generation, and line reading and writing operations
                    - - 3 to output parameters, program steps outside of line
                    generation, and display Shrinking or Stretching
                    operations.
*/
// interdig.cpp - Read BMPS, add borders, resize, interdigitate,
//     create anamorphic sized output and resized output
//     (all resizing using averaging interpolation),
//     (all reading and writing of files is one line at a time).
// BMP files consist of the following components:
//     File Header = 14 bytes
//     Bitmap info Header = 40 bytes
//     for some files, a 256-color Palette, padded in RGBx quads = 1024 bytes
//     for other files, no Color Palette (0 bytes)
//     Width*Height Bitmap image -- 1 byte per pixel if there's a Color palette
//                                                                          --
3 bytes per pixel if there's no Color palette
//     The end of each line is padded with 0, 1, 2, or 3 bytes (of value 0)
//     because all lines need to be a multiple of 4 bytes long
//     (another undocumented Microsoft "feature" to make disk reads and writes
//     quicker).
//     Note: all lines have the same number of pad bytes
//     since all lines have the same Width.
//     At the end of all BMP files there are always 2 pad bytes (of value 0)
//     (for unknown Microsoft reason(s) ).
#include <stdio.h>
#include <conio.h>      // getch( )
#include <iostream.h>
#include <malloc.h>     // malloc( ), free( )
#include <errno.h>      // file error numbers
#define WATCOM32 1
*include "limits.hpp"   // MAXVIEWS, MAXWXDTH
#include "bmptools.hpp"
#include "interdig.hpp"           // opening Greetings, global variables
void printUnexferedPixelInfo( char * BorderedLines_bufPtr, int ImageNum,
BlockCount )                                                   int
//
//     EFFECTS    : calculate the number of pixels not transfered from
//                  BorderedLines_buf to AmorphLines_buf and print out.
//     MODIFIES   :
//     REQUIRES   : values for PixelWidth, BIS_Width, BorderedLines_buf,
//                  BorderedLineLength, BIS_InputLineLength, BorderSize
//     RETURNS    :
```

EXHIBIT A
-continued

```
//      SEE ALSO   :
//
{
    // print out number of untransfered pixels from an image
    //         (the number is the same for each image):
    printf( "\n      BlockCount = %i\n", BlockCount );
    printf( "      ImageNum = %i\n", - -ImageNum );
    printf( "Pixels lost from right side of BorderedLines_buf:\n" );
    printf( "      Width of Image         = %i pixels.\n", PixelWidth );
    printf( "      Width of Bordered Image   = %i pixels.\n", BIS_Width );
    printf( "      BorderedLines_buf      = %i\n", BorderedLines_buf );
    printf( "      BorderedLineLength     = %i bytes.\n", BorderedLineLength );
    printf( "      BIS_InputLineLength    = %i bytes.\n", BIS_InputLineLength );
    printf( "      BorderedLines_bufPtr   = %i\n", BorderedLines_bufPtr );
    int Offset = BorderedLines_bufPtr - BorderedLines_buf;
    printf( "      Offset into buf      = %i\n", Offset );
    int ImageOffset = Offset - (ImageNum * BIS_InputLineLength);
    printf ( "      Offset into this image = %i\n", ImageOffset );
    int numUnxferdBytes = BIS_InputLineLength - ImageOffset;
    printf( "      Num unxfered bytes from this image = %i bytes.\n",
numUnxferdBytes );
    printf( "      Num unxfered pixels from this image = %i pixels.\n",
numUnxferdBytes / 3 );
    printf( "      Num right border pixels = %i pixels.\n", BorderSize / 2 );
    int numLostImgPixels = (numUnxferdBytes / 3) - (Bordersize / 2);
    // if numLostImgPixels < 0 then only Border pixels are lost:
    if ( numLostImgPixels < 0 ) numLostImgPixels = 0;
    printf( "      Num pixels lost from image data = %i pixels.\n",
numLostImgPixels );
    float PctImgLost = 100 * (float) (numLostImgPixels) / (float) (BIS_Width);
    printf( "      Percentage of Image lost = %f \%.\n", PctImgLost );
    printf( "      Hit any key...\n" );
    getch( );
    printf ( "\n" );
    return;
}
void CloseInputFiles( )
//
//    EFFECTS    : Close all input file stream objects.
//    MODIFIES   :
//    REQUIRES   : all input file stream objects are open.
//    RETURNS    :
//    SEE ALSO   : CloseAllFiles, Goodbye
//
{
    for ( int ViewCount=0; ViewCount<NumViews; ViewCount++ )
        ifsPtr[ViewCount] -> close( );
    return;
}
void CloseAllFiles( )
//
//    EFFECTS    : Close all input and output file stream objects.
//    MODIFIES   :
//    REQUIRES   : all input and output file stream objects are open.
//    RETURNS    :
//    SEE ALSO   : CloseInputFiles, Goodbye
//
{
    CloseInputFiles( );
    ofsPtr -> close( );
    return;
}
void Goodbye( )
//
//    EFFECTS    : Close all input and output file stream objects,
//                 free allocated memory,
//                 delete allocated input file stream object space.
//    MODIFIES   :
//    REQUIRES   : all input and output file stream objects are open,
//                 memory is allocated for BorderedLines_buf,
//                 space is allocated for input file stream objects
//    RETURNS    :
//    SEE ALSO   : CloseAllFiles, CloseInputFiles
//
{
    if (Debug) {
        printf( "\nAbout to close all files...\n" );
```

-continued

EXHIBIT A

```
        getch( );
    }
    CloseAllFiles( );
    if (Debug) {
        printf( "All files closed OK. About to free BorderedLines_buf
memory...\n" );
        getch( );
    }
    free ( BorderedLines_buf );
    if (Debug) {
        printf( "BorderedLines_buf freed OK. About to free AmorphLines_buf
memory... \n" );
        getch( );
    }
    free( AmorphLines_buf );
    if (Debug) {
        printf( "AmorphLines_buf freed OK. About to free Pad_buf memory...\n" );
        getch( );
    }
    free( Pad_buf );
    if (Debug) {
        printf( "Pad_buf freed OK. About to delete file stream objects...\n" );
        getch( );
    }
    for ( int ViewCount=0; ViewCount<NumViews; ViewCount++ )
        delete ifsPtr [ViewCount];
    delete ofsPtr;
    if (Debug) {
        printf( "File stream objects Deleted OK.\n" );
        getch( );
    }
    return;
}
Boolean WritePadBytes( ofstream &OutputStream, int numBytes )
//
//   EFFECTS    : Write numBytes bytes from Pad_buf to OutputStream.
//   MODIFIES   : Output Stream
//   REQUIRES   : OutputStream is writeable, binary.
//   RETURNS    : TRUE if written OK, FALSE if Not
//   SEE ALSO   : SkipLinePadBytes
//
{
    if ( numBytes == 0 ) return TRUE;     // don't do anything if no
pad bytes.
    OutputStream.write ( (char *) Pad_buf, numBytes );
    if ( !OutputStream.good( ) )
        return FALSE;
    return TRUE;
}
Boolean WriteLine( ofStream &OutputStream. int numBytes )
//
//   EFFECTS    : Write numBytes bytes from AmorphLines_buf to outputStream,
//                then write AmorphLinePadBytes to end of line in OutputStream.
//   MODIFIES   : Output Stream
//   REQUIRES   : value for AmorphLinePadBytes.
//                OutputStream is writeable, binary.
//   RETURNS    : TRUE if written OK, FALSE if Not
//   SEE ALSO   : ReadLine
//
{
    // write the line from AmorphLines_buf to output stream:
    if (Debug == 2) printf( "     WriteLine to output file:\n");
    OutputStream.write ( (char *) AmorphLines_buf, numBytes );
    if ( !OutputStream.good( ) )
        return FALSE;
    if (Debug == 2) printf( "     %i bytes written OK.\n", numBytes);
    // write line pad bytes to the end of this line in the output stream:
    if (Debug == 2) printf( "     Write line pad bytes to output file:\n")
    if ( !WritePadBytes( OutputStream, AmorphLinePadBytes ) )
        return FALSE;
    if (Debug == 2) printf( "     %i pad bytes written OK.\n",
AmorphLinePadBytes);
    return TRUE;
}
Boolean SkipLinePadBytes( ifstream &InputStream )
//
//   EFFECTS    : Skip numLinePadBytes bytes in InputStream
```

EXHIBIT A

```
//              by reading them into Pad_buf,
//              then check that all of the pad bytes have the correct value.
// MODIFIES  : Input Stream
// REQUIRES  : value for numLinePadBytes,
//             InputStream is readable, binary.
// RETURNS   : TRUE if read OK, FALSE if Not or if a non-zero pad byte was read.
// SEE ALSO  : WritePadBytes
//
{
    char * Pad_buf Ptr;          // pointer to Pad_buf
    if (Debug == 2) {
        printf( "   SkipLinePadBytes in input file...\n");
        getch( );
    }
    inputStream.read ( (char *) Pad_buf, numLinePadBytes );
    if ( !InputStream.good( ) )
        return FALSE;
    if (Debug == 2) printf("    SkipLinePadBytes OK.\n");
    //test that all pad bytes = PadByteValue:
    Pad_bufPtr = Pad_buf;
    for( int ByteCount=0; ByteCount<numLinePadBytes; ByteCount++]) {
        if ( *(Pad_bufPtr++) != PadByteValue ) {
            printf( "Error reading bmp file: non-zero pad byte.\n" );
            return FALSE;
        }
    }
    if (Debug == 2) printf( "   %i line pad bytes skipped OK.\n",
numLinePadBytes);
    return TRUE;
}
Boolean ReadLine( ifstream &InputStream, long offset, int numBytes )
//
// EFFECTS    : Read numBytes bytes from InputStream into BorderedLines_buf
//              at offset,
//              then skip over numLinePadBytes bytes of padding by reading
//              them into Pad_buf.
// MODIFIES  : BorderedLines_buf, Input Stream
// REQUIRES  : value for InputLineLength,
//             InputStream is readable, binary.
// RETURNS   : TRUE if read OK, FALSE if Not or if a non-zero pad byte was read.
// SEE ALSO  : WriteLine
//
{
    long offset2;
    char * BorderedLines_buf Ptr;    // pointer to BorderedLines_buf
    if (Debug == 2) printf( "    ReadLine: BL_buf = %i offset =
%i  \n", BorderedLines_buf, offset);
    InputStream.read ( (char *) (BorderedLines_buf + offset), numBytes );
    if ( !InputStream.good( ) )
        return FALSE;
    if (Debug == 2) {
        for ( offset2=offset; offset2 < (offset + InputLineLength); offset2++ ) {
            BorderLines_bufPrt = (char *) (BorderedLines_buf + offset2);
            if ( offset2 > BorderedLineLength ) return FALSE;
                printf("    BL_buf = %i offset2 = %i BL_bufPtr = %i byte
= %i\n",
                BorderedLines_buf, offset2, BorderedLines_bufPtr,
*(BorderedLines_bufPtr) );
            getch( );
        }
    }
    // skip over line pad bytes at end of this line in input file stream;
    if ( !SkipLinePadBytes( InputStream ) )
        return FALSE;
    return TRUE;
}
void XferBlock ( char* BorderedLines_bufPtr, char * AmorphLines_bufPtr )
//
// EFFECTS    : Transfer a pixel from each Image in BorderedLines_buf
//              (BorderedLines_bufPtr points to the correct pixel
//              in the 1st Image of BorderedLines_buf)
//              to a Block (pointed to by AmorphLines_bufPtr)
//              in AmorphLines_buf.
//              This function will not write into AmorphLines_buf
//              AmorphLines_bufPtr becomes greater than AmorphLines_buf.
// MODIFIES  :
// REQUIRES  : values for numBytesPerPixel, NumView, BIS_InputLineLength
```

EXHIBIT A -continued

```
//      RETURNS     :
//      SEE ALSO    :
//
{
    // interdigitate this Pixel from each Image in BorderedLines_buf
    //      into the Block in AmorphLines_buf;
    for ( int ImageCount=0; ImageCount<NumViews; ImageCount++ ) {
        // transfer this Pixel from this Image of BorderedLines_buf
        //      into the Block in AmorphLines_buf;
        for ( int ByteCount=0; ByteCount<numBytesPerPixel; ByteCount++ ) {
            if (Debug == 3)
                    printf( "     BorderedLines_bufPtr = %i , AmorphLines_bufPtr = %i\n",
                            BorderedLines_bufPtr, AmorphLines_bufPtr );
            if ( AmorphLines_bufPtr < (AmorphLines_buf + AmorphLineLength) )
                    *(AmorphLines_bufPtr++) = *(BorderedLines_bufPtr++);
            else if (Debug == 3) printf( "Attempted to write beyond end of AmorphLines_buf.\n" );
        }
        // reset pointer to beginning of this Pixel in this Image:
        BorderedLines_bufPtr -= numBytesPerPixel;
        // incr to point to same Pixel in next Image
        BorderedLines_bufPtr += BIS_InputLineLength;
    }
    if (Debuf == 3) {
        printf ("     Hit any key...\n" );
        getch( );
    }
    return;
}
void AvgInterpolate( char * BorderedLines_bufPtr,
char * AmorphLines_bufPtr, int HoleWidth )
//
//      EFFECTS     : fills a "hole" pointed to by AmorphLines_bufPtr
//                    with Averaged Interpolated pixel data.
//                    a "hole" is HoleWidth Blocks wide
//
//                    we enter this function with BorderedLines_bufPtr pointing to
//                    "previous" Pixel (at Blue value if RGB) in Image 0 in
BorderedLines_buf.
//                    and with AmorphLines_bufPtr pointing to 1st pixel (at Blue val if
RBG)
//                    of the most recently filled Block in AmorphLines_buf.
//
//                    the algorithm is like this:
//                    for each Image {
//                        for each byte of the pixel {
//                            get two "surrounding" color values form BorderedLines_buf,
//                            calculate linear Averaged incr value for color value
//                                = PreValue + ( (NextVal + PrevVal) / (HoleWidth + 1) )
//                            for each Block in the "hole" {
//                                update the linear Avg incr value
//                                and store it in this byte of the pixel
//                                in this Image's spot in this Block
//                                (but only if we are still pointing within
AmorphLines_buf)
//                            }
//                        }
//                    }
//
//      MODIFIES    : AmorphLines_buf, AmorphLines_bufPtr
//      REQUIRES    : values for BlockLength
//      RETURNS     :
//      SEE ALSO    :
//
{
    int                 colorValue, LinearAvgIncrValue;
    if (Debug == 3) {
                    printf( "Fill hole: HoleWidth=%2i A_Ptr=%5i B_Ptr=%5i\n",
                            HoleWidth,
(AmorphLines_bufPtr - AmorphLines_buf), (BorderedLines_bufPtr - BorderedLines_buf) );
    }
    // if HoleWidth = 0 then there is nothing to do:
    if ( HoleWidth == 0 ) {
        if (Debug == 3) printf("     HoleWidth = 0 -- no 'hole' to create or fill.\n" );
```

-continued

EXHIBIT A

```
            return;
        }
        // incr BorderLines_buf pointer to "next" Pixel in 1st Image:
        BorderedLines_bufPtr += numBytesPerPixel;
        // incr AmorphLines_buf pointer to point to
        //              1st pixel of "hole" to be filled in AmorphLines_buf.
        AmorphLines_bufPtr += BlockLength;
        // if BorderLines_bufPtr is pointing beyond the 1st Image of
        //              BorderLines_buf by more than one pixel,
        //              then max BorderedLines_bufPtr out to point to the one pixel beyond
        //              the 1st Image of BorderedLines_buf:
        if ( BorderedLines_bufPtr > BorderedLines_buf + BIS_InputLineLength ) {
            BorderedLines_bufPtr = BorderedLines_buf + BIS_InputLineLength;
            if (Debuf == 3) printf( "Max-ed out BorderedLines_bufPtr.\n" );
        }
        for ( int ImageNum=0; ImageNum<NumViews; ImageNum++ ) {
            for ( int ByteCount=0; ByteCount<numBytesPerPixel; ByteCount++ ) {
                // get color value from "next" pixel of this Image:
                ColorValue = *(BorderedLines_bufPtr);
                // subtract color value from "previous" pixel of this Image:
                ColorValue -= *((BorderedLines_bufPtr) - numBytesPerPixel);
                // get a linear Averaged increment value for the color value:
                LinearAvgIncrValue = ColorValue / (HoleWidth + 1);
                // reset ColorValue, ready to be incr for each Block of the "hole",
                //      and point to next byte in the Block:
                ColorValue = *((BorderedLines_bufPtr++) - numBytesPerPixel);
                // if there is a "hole" at the end of the buffer,
                //              then just copy "previous" pixel info into the "hole"
                //              (by setting LinearAvgIncrValue = 0);
                if ( AmorphLines_bufPtr >= (AmorphLines_buf + AmorphLineLength - (HoleWidth * BlockLength)) )
                            LinearAvgIncrValue = 0;
                // for each Block in the "hole" store a linear avg color value in
                //      this pixel;
                for ( int BlockCount=0; BlockCount<HoleWidth; BlockCount++ ) {
                    // set next incr value for linear Averaged color value:
                    ColorValue += LinearAvgIncrValue;
                    // if we are pointing within AmorphLines_buf
                    //      store it in color value of this Image's position of "hole":
                    if ( AmorphLines_bufPtr < (AmorphLines_buf + AmorphLineLength) )
                    {
                        if (Debug == 3) {
                            printf( "   hole: ImgNum=%2i ByteCount=%1i BlockCount=%3i A_Ptr=%5i B_Ptr=%5i CV =%3i\n",
                                ImageNum, ByteCount, BlockCount,
                                (AmorphLines_bufPtr - AmorphLines_buf),
                                (BorderedLines_bufPtr - BorderedLines_buf), ColorValue );
                            getch( );
                        }
                        *(AmorphLines_bufPtr) = ColorValue;
                    }
                    // point to this Byte in the next Block in the "hole";
                    AmorphLines_bufPtr += BlockLength;
                }
                // reset pointer 1st Block in the "hole";
                AmorphLines_bufPtr -= (BlockLength * HoleWidth);
                // incr pointer to the next byte of the 1st Block in the "hole";
                AmorphLines_bufPtr++;
            }
            // reset pointer to beginning of pixel;
            BorderedLines_bufPtr -= numBytesPerPixel;
            // incr pointer to beginning of same pixel in next image;
            BorderedLines_bufPtr += BIS_InputLineLength;
        }
        return;
    }
void Shrink( )
//
//      EFFECTS    : Transfer the line from BorderedLines_buf into AmorphLines_buf
//                          by interdigitating and shrinking,
//                          skipping pixels from BorderedLines_buf as we go along.
//
//                          The algorithm is like this;
//                          for BlockCount = 1 to NumBlocks {
```

-continued

EXHIBIT A

```
//                     copy 1 Block from BorderedLines_buf to AmorphLines_buf
(interdigitated)
//                     skip numSkipPixels pixels from BorderedLines_buf
//                     if accumulated error > 1 pixel
//                         then skip 1 more pixel from BorderedLines_buf
//                     }
//
//
//    MODIFIES    : AmorphLines_buf
//    REQUIRES    : Values for BorderedLineLength, AmorphLineLength,
//                  NumBlocks, BIS_InputLineLength, NumViews, numBytesPerPixel,
//                  ShrinkRatio, BlockLength
//    RETURNS     :
//    SEE ALSO    : Stretch
//
{
    int            numSkipPixels      = (int( ShrinkRatio;
    double         XferAccumError     = ShrinkRatio – (int)ShrinkRatio;
    char*          BorderedLines_bufPtr = BorderedLines_buf;
    char*          AmorphLines_bufPtr   = AmorphLines_buf;
    int            SkippedPixelCount  = 0;
    if (Debug == 3) {
        printf( "ShrinkRatio      = %f ...\n", ShrinkRatio );
        getch( );
    }
    // initialize pointer for going through the BlockCount loop;
    BorderedLines_bufPtr –= (numSkipPixels) + numBytesPerPixel;
    AmorphLines_bufPtr –= BlockLength;
    for ( int BlockCount=1; BlockCount<=NumBlocks; BlockCount++ ) {
        // if we've reached an accumulated error of over 1 pixel,
        //         then add another pixel to skip from BorderedLines_buf
        if ( XferAccumError >= 1.0 )
            numSkipPixels++;
        if (Debug == 3) {
            printf( "\nBlockCount      = %i\n", BlockCount );
            printf( "xferAccumError = %f\n", XferAccumError );
            printf( "numSkipPixels = %i\n", numSkipPixels );
        }
        // incr BorderLines_buf pointer to skip numSkipPixels pixels;
        BorderedLines_bufPtr += numSkipPixels * numbBytesPerPixel;
        // incr AmorphLines_buf pointer to point to next Block to fill;
        AmorphLines_bufPtr += BlockLength;
        // Transfer a pixel from each Image in BorderedLines_buf
        //           (BorderedLines_bufPtr points to the correct pixel in
        //           1st Image of BorderedLines_buf)
        //           to Block (pointed to by AmorphLines_bufPtr) in
        //           AmorphLines_buf:
        XferBlock ( BorderLines_BufPtr, AmorphLines_bufPtr );
        if (Debug == 3) {
            SkippedPixelCount = SkippedPixelCount + numSkipPixels – 1;
        }
        // if we just skipped an extra pixel this time through the loop;
        //           then decr accumulated error to account for it
        //           and reset numSkipPixels to the regular amount:
        if ( XferAccumError >= 1.0 ) {
            XferAccumError = XferAccumError – 1.0;
            numSkipPixels––;
        }
        // update accumulated fractional error of how many pixels we
        //           skipped;
        XferAccumError = XferAccumError + ShrinkRatio – (int) ShrinkRatio;
    }
    if  (Debug == 3) {
        printf( "\nTotal number of skipped pixels: %i ...\n", SkippedPixelCount
);
        getch( );
    }
    return;
}
void Stretch( )
//
//    EFFECTS     : Transfer the line from BorderedLines_buf into AmorphLines_buf
//                  by interdigitating and stretching.
//                  filling "holes" with Averaged Interpolated pixel data.
//
//                  The algorithm is like this:
//                  for BlockCount = 1 to NumBlocks {
```

-continued

EXHIBIT A

```
//                copy 1 Block from BorderedLines_buf to AmorphLines_buf
(interdigitated)
//                create and fill "holes" numHolesBlocks Blocks wide in
AmorphLines_buf
//                    if accumulated error > 1 pixel
//                        then make the "hole" in AmorphLines_buf 1 Block wider
//                }
//
//    MODIFIES   : AmorphLines_buf
//    REQUIRES   : values for BorderedLineLength, AmorphLineLength,
//                 NumBlocks, BIS_InputLineLength, NumViews, numBlocksPerPixel,
//                 StretchRatio, BlockLength
//    RETURNS    :
//    SEE ALSO   : Shrink, AvgInterpolate
//
{
    int            numHoleBlocks     = (int) (StretchRatio) - 1;
    double         xferAccumError    = StretchRatio - (int)StretchRatio;
    char*          BorderLines_bufPtr = BorderLines_buf;
    char*          AmorphLines_bufPtr = AmorphLines_buf;
    int            HoleBlockCount    = 0;
    if (Debug == 3) {
        printf( "StretchRatio     = %f ...\n", StretchRatio );
        getch( );
    }
    // initialize pointers for going through the BlockCount loop:
    BorderLines_bufPtr -= numBytesPerPixel;
    AmorphLines_bufPtr -= BlockLength;
    for ( int BlockCount=1; BlockCount<=NumBlocks; BlockCount++ ) {
        // if we've reached an accumulated error of over 1 pixel,
        //         then make the "hole" we'll add in AmorphLines_buf 1 Block
wider:
        if ( XferAccumError >= 1.0 )
            numHoleBlocks++;
        if (Debug == 3) {
            printf( "\nBlockCount = %i\n", BlockCount );
            printf( "XferAccumError = %f\n", XferAccumError );
            printf( "numHoleBlocks = %i\n", numHolesBlocks );
        }
        // incr BorderLines_buf pointer to next Pixel in 1st Image:
        BorderedLines_bufPtr += numBytesPerPixel;
        // incr AmorphLines_buf pointer to point to next Block to fill:
        AmorphLines_bufPtr += BlockLength;
        // Transfer a pixel from each Image in BorderedLines_buf
        //         (BorderedLines_bufPtr points to the correct pixel in
        //         1st Image of BorderedLines_buf)
        //         to Block (pointed to by AmorphLines_bufPtr) in
        //         AmorphLines_buf:
        XferBlock ( BorderedLines_bufPtr, AmorphLines_bufPtr );
        // Create a "hole" of numHoleBlocks Blocks width in
        //         AmorphLines_buf and fill it with avg. interpolated pixels:
        AvgInterpolate ( BorderedLines_bufPtr, AmorphLines_bufPtr, numHoleBlocks
);
        // incr pointer past the now filled "hole":
        AmorphLines_bufPtr += numHoleBlocks * BlockLength;
        // incr BlockCount to account for filled "hole":
        BlockCount = BlockCount + numHoleBlocks;
        if (Debug == 3) HoleBlockCount = HoleBlockCount + numHoleBlocks;
        // if we added and extra Block of "hole" this time through the loop,
        //         then decr accumulated error to account for it
        //         and reset numHoleBlocks to the regular amount:
        if ( XferAccumError >= 1.0 ) {
            XferAccumError = XferAccumError - 1.0;
            numHoleBlocks--;
        }
        // update accumulated fractional error of how many pixels we skipped:
        XferAccumError = XferAccumError + StretchRatio - (int) StretchRatio;
    }
    if (Debug == 3) {
        printf( "\nTotal number of added Blocks: %i ...\n", HoleBlockCount
);
        getch( );
    }
    return;
}
void Interdigitate( )
//
```

EXHIBIT A -continued

```
//      EFFECTS     : transfer the line from BorderLines_buf into AmorphLines_buf
//                    by interdigitating and stretching or shrinking,
//                    filling "holes" (if stretching) with
//                    Averaged Interpolated pixel data,
//                    or skipping data (if shrinking),
//
//                            for Stretching:
//                            the Stretch function works by adding "holes" into
//                            AmorphLines_buf as it interdigitates sets of pixels
//                            from BorderedLines_buf -- "holes" are evenly dispersed
//                            throughout BorderedLines_buf. (A "hole" is empty
//                            Blocks (1 or more Blocks wide) in AmorphLines_buf
//                            put in between Blocks that were copied directly from
//                            BorderedLines_buf. "Holes" are filled with averaged
//                            interpolated data from the Blocks on either side of
//                            the "hole".)
//
//                            for Shrinking:
//                            the Shrink function works by skipping pixels from
//                            BorderedLines_buf as it interdigitates unskipped
//                            pixels into AmorphLines_buf -- skipped pixels are
//                            evenly dispersed throughout BorderedLines_buf.
//
//      MODIFIES    : AmorphLines_buf
//      REQUIRES    : values for BorderLineLength, AmorphLineLength,
//                    NumBlocks, BIS_InputLineLength, NumViews, numBlocksPerPixel,
//                    StretchRatio, ShrinkRatio, BlockLength
//      RETURNS     :
//      SEE ALSO    : Stretch, Shrink
//
{
    long        offset, offsetStart, offsetEnd;
    // test for Shrink or Stretch condition:
    if ( ShrinkRatio >= 1.0 ) {
        // if ShrinkRatio > 1.0, then we have to delete Blocks
        // if ShrinkRatio = 1.0, then we neither Stretch nor Shrink
        //             but the Shrink function deals with this case:
        Shrink( );
    }
    else {
        // we have to add Blocks ("holes"):
        Stretch( );
    }
    return;
}
void InsertBorder(int BorderColor, lone offsetStart, long offsetEnd)
//
//      EFFECTS     : fill BorderedLines_buf with BorderColor
//                    between offsetStart and offsetEnd.
//      MODIFIES    : BorderedLines_buf
//      REQUIRES    :
//      RETURNS     :
//      SEE ALSO    :
//
{
    char * BorderedLines_bufPtr;        // pointer to BorderedLines_buf
    long offset;
    offset = offsetStart;
    if (Debug == 2) printf( "      InsertBorder: offsetStart = %i offsetEnd = 
% i\n", offsetStart, offsetEnd);
    for ( offset=offsetStart; offset<offsetEnd; offset++ ) {
        BorderedLines_bufPtr = (char *) (BorderedLines_buf + offset);
        if ( offset > BorderedLineLength ) {
            printf( "WARNING!! -- miscalculation of buffer offset value!!\n" );
            return;
        }
        *(BorderLines_bufPtr) = BorderColor;
        if (Debug == 2) {
            printf( "      BL_buf = %i offset = %i BL_bufPtr = % i Color = 
%i\n", BorderedLines_buf, offset, BorderedLines_bufPtr, BorderColor );
            getch( );
        }
    }
    return;
}
Boolean InsertBorderedImageLine(int BorderColor, int ImageNumber,
                                                              int
```

-continued

EXHIBIT A

```
LineNumber)
//
//      EFFECTS    : puts one bordered line into BorderedLines_buf
//                   i.e., put the following into BorderedLines_buf:
//                   a left border,
//                   a line of image from the input file
//                   (skipping line pad bytes),
//                                                            and a
right border.
//      MODIFIES   : BorderedLines_buf,
//                   input file stream pointed to by ifs[ImageNumber]
//      REQUIRES   :
//      RETURNS    : TRUE if reading the image line was good, FALSE if not
//      SEE ALSO   :
//
{
    long      offsetStart, offsetEnd;
    int                 BorderSizePerSide = BorderSize/2;
    int                 numSideBorderBytes = BorderSizePerSide * numBytesPerPixel;
    int       DebugCount = 0;
    // put a left border into BorderedLines_buf:
    offsetStart = BIS_InputLineLength * ImageNumber;
    offsetEnd = offsetStart + numSideBorderBytes;
    if (Debug == 2) {
        printf( "    offsetStart = %i offsetEnd = %i\n", offsetStart, offsetEnd
);
        printf( "    About to put left border in BorderedLines_buf...\n" );
        getch( );
    }
    InsertBorder( BorderColor, offsetStart, offsetEnd );
    if (Debug == 2) {
        printf( "    Left border done OK.\n" );
        printf( "    offset = %i, InputLineLength = %i ImageNumger = %i\n",
offsetEnd, InputLineLength, ImageNumber );
        printf( "    About to put an image line in BorderedLines_buf...\n" );
        getch( );
    }
    // put a line of image from input file into BorderedLines_buf
    //            (and skip over the line pad bytes at the end of this line):
    offsetStart = offsetEnd;        // start where left border ends.
    if ( !ReadLine( *ifsPtr[ImageNumber], offsetStart, InputLineLength ) )
        return FALSE;
    if (Debug == 2) {
        cout << "LineNumber" << offsetEnd << " ";
        if ((++DebugCount) % 9 == 0) printf( "\n" );
        if (DebugCount % 180 == 0) {
            printf( "         hit any key. . .\n" );
            getch( );
        }
    }
    // put a right border into BorderedLines_buf:
    offsetStart = offsetStart + InputLineLength;        // right border
starts after input line.
    offsetEnd = (BIS) printf( "   Right border done OK.\n" );
    return TRUE;
}
int ReadInputLinesAndWriteOutputLine( )
//
//      EFFECTS    : Read a line from each bmp file and combine then in
BorderedLines_buf
//                   (adding a border:
//                   black for 1st NumBlackBorders input files
//                   (pointed to by last NumBlackBorders ifs object pointers)
//                   white for the rest)
//                   (skipping over line pad bytes in input file streams),
//                   then resize and interdigitate the combined line form
//                   BorderedLines_buf to the AmorphLines_buf,
//                   then write the line form AmorphLines_buf to Amorph output file
//                   (adding line pad bytes at end of each line),
//                   and repeat the above (one line at a time) till done,
//                   then add file pad bytes at end of file.
//      MODIFIES   : BorderedLines_buf, Input Streams, Output Stream
//      REQUIRES   : values for PixelWidth, PixelHeight, BIS_Width, BIS_Height,
//                   numBytesPerPixel, NumViews, NumBlackBorders
//                   InputLineLength, BIS_InputLineLength, AmorphLineLength
//                   StretchRatio, ShrinkRatio, BlockLength,
//                   numLinePadBytes, numFilePadBytes
```

EXHIBIT A

```
//                  all input and output file stream objects open,
//                  memory allocated for BorderedLines_buf, AmorphLines_buf, Pad_buf
//     RETURNS    : Error code
//     SEE ALSO   :
//
{
    const int White = 255;
    const int Black = 0;
    int                 BorderColor;
    int                 BorderSizePerSide = BorderSize/2;
    int         DotCount = 0;
    long        offsetStart, offsetEnd;
    if (Debug) {
        printf( "\nAbout to read lines, xfer and write to file: %s...\n",
amphfile );
        getch( );
    }
    // go through all input files a line at a time:
    for ( int LineCount=BIS_Height; LineCount>0; LineCount-- ) {
        // read a line form each input file and combine (with border) in
BorderedLines_buf:
        for ( int ViewCount=0; ViewCount<NumViews; ViewCount++ ) {
            // pick border color:
            if ( ViewCount >= (NumViews-NumBlackBorders) )
                BorderColor = Black;   // first NumBlackBorders input files have
Black border.
            else
                BorderColor = White;   // all other input files have White
borders.
            // check if this should be a whole border line (at top or at bottom):
            if ( (LineCount <= BorderSizePerSide) ||
                 (LineCount > (BIS_Height - BorderSizePerSide)) ) {
                // put in whole border line:
                offsetStart = BIS_InputLineLength * ViewCount;
                offsetEnd   = BIS_InputLineLength * (ViewCount+1);
                if ( Debug == 2) {
                    printf( "\nLineCount = %i ViewCount = %i offsetStart = %i
offsetEnd = %i .\n", LineCount, ViewCount, offsetStart, offsetEnd );
                    printf( "About to do a whole border line...\n" );
                    getch( );
                }
                InsertBorder( BorderColor, offsetStart, offsetEnd );
            }
            else {
                if ( Debug == 2 ) {
                    printf( "\nLineCount = %i ViewCount = %i . About to do a
bordered line...\n", LineCount, ViewCount );
                    getch( );
                }
                // put the following into BorderedLines_buf;
                //          a left border,
                //          a line of image from the input file
                //              (skipping pad bytes at end of line of input
file).
                //          and a right border.
                if ( !InsertBorderedImageLine(BorderColor, ViewCount, LineCount)
) {
                    // create sequential file name for error message:
                    sprintf( (infile+InFileNameLen), "%03i.bmp", [NumViews-
ViewCount) );
                    printf( "Error reading file: %s\n", infile );
                    printf( "     errno = %i\n", errno );
                    Goodbye( );
                    return FileReadError;
                }
            }
        }
        if ( Debug == 2 ) {
            printf( "   Here's the line:...\n" );
            getch( );
            for ( long offsetDebug=0; offsetDebug<BorderedLineLength; offsetDebug
+= numBytesPerPixel ) {
                printf( "   %3i", *(BorderedLines_buf+offsetDebug) );
                printf( "   %3i", *(BorderedLines_buf+offsetDebug+1) );
                printf( "   %3i", *(BorderedLines_buf+offsetDebug+2) );
                printf( "\n" );
            }
```

-continued

EXHIBIT A

```
    }
    if ( Debug == 2 ) {
        printf( "Finished filling BorderedLines_buf. About to do
Interdigitation..\n" );
        getch( );
    }
    // transfer the line form BorderedLines_buf into AmorphLines_buf,
    //       by interdigitating and stretching or shrinking
    Interdigitate( );
    if ( Debug == 2 ) {
        printf( "Interdigitation OK. About to write the line to file:
%s...\n", amphfile );
        getch( );
    }
        // write the line from AmorphLines_buf to the Amorph output file
        //          (and write line pad bytes at the end of this line):
        if ( !WriteLine( *ofsPtr, AmorphLineLength ) ) {
            printf( "Error writing file: %s\n", amphfile );
            printf( "       errno = %i\n", errno );
            Goodbye( );
            return FileWriteError;
        }
        if ( Debug == 2 ) {
            printf( "Line writen OK. About to do next line...\n", amphfile );
            getch( );
        }
        printf( "." );            // print a "." for each line read and xfered
        if ( ((++DotCount) % 79) == 0) printf( "\n" );
    }
    // write end of file pad bytes to Amorph output file:
    if (Debug) printf( "\n\nWrite file pad bytes to output file:\n");
    if ( !WritePadBytes( *ofsPtr, numFilePadBytes ) ) {
        printf( "Error writing file: %s\n", amphfile );
        printf( "       errno = %i\n", errno );
        Goodbye( );
        return FileWriteError;
    }
    if  (Debug) printf( "     %i pad bytes written OK.\n", numFilePadBytes);
    if  (Debug) {
        printf( "\n" );
        printf( "     Hit any key...\n" );
        getch( );
        printf( "\nAll bit maps read OK. File: %s written OK.\n\n", amphfile );
    }
    return no Error;
}
void initPad_buf( )
//
//    EFFECTS    : sets all bytes in Pad_buf = PadByteValue.
//    MODIFIES   : Pad_buf
//    REQUIRES   : values for maxPadBytes, PadByteValue
//    RETURNS    :
//    SEE ALSO   :
//
{
    char * Pad_bufPtr;            // pointer to Pad_buf
    Pad_bufPtr = Pad_buf;
    for ( int ByteCount=0; ByteCount<maxPadBytes; ByteCount++ ) {
        *(Pad_bufPtr++) = PadByteValue;
    }
    return;
}
int AllocateMem( )
//
//    EFFECTS    : Allocate memory for BorderedLines_buf --
//                       enough to combine 1 line form each input file with borders
//                       and with line padding,
//                       for AmorphLines_buf (resized, interdigitated of above buf),
//                       and for Pad_buf -- 4 bytes to store padding bytes.
//                       Also initializes all Pad_buf bytes = PadByteValue.
//    MODIFIES   : Pad_buf
//    REQUIRES   : values for BorderedLineLength, AmorphLineLength, numLinePadBytes
//    RETURNS    : Error code
//    SEE ALSO   :
//
{
    if (Debug) {
```

EXHIBIT A -continued

```
        printf( "\nAbout to allocate memory for BorderedLines_buf,
AmorphLines_buf, Pad_buf\n" );
        cout    <<  "   NumViews = " << NumViews << endl
                <<  "   numBytesPerPixel = "   <<numBytesPerPixel   <<
endl
                <<      "   PixelWidth = "                          <<
PixelWidth                                  << endl
                <<  "   BorderSize = "                      <<
BorderSize                                  << endl
                <<  "   numLinePadBytes = "       << numLinePadBytes   <<
endl
                <<  "   maxPadBytes = "           << maxPadBytes       <<
endl
                <<  "   BorderedLineLength = "  << BorderedLineLength   << endl
                <<  "   AmorphLineLength = "    << AmorphLineLength     <<
endl;
        printf( "        hit any key. . .\n" );
        getch( );
    }
    BorderedLines_buf = (char *) malloc( BorderedLineLength );
    if (BorderedLines_buf == NULL) {
        CloseAllfiles( );
        printf( "Unable to allocate enough memory: BorderedLines_buf.\n" );
        return MallocError;
    }
    AmorphLines_buf = (char *) malloc( AmorphLineLength + maxPadBytes );
    if (AmorphLines_buf == Null) {
        Close AllFiles( );
        printf( "Unable to allocate enough memory: AmorphLines_buf.\n" );
        return MallocError;
    }
    Pad_buf = (char *) malloc( maxPadBytes );
    if (Pad_buf == NULL) {
        CloseAllFiles( );
        printf( "Unable to allocate enough memory: Pad_buf.\n" );
        return MallocError;
    }
    // set all bytes of Pad_buf = PadByteValue:
    initPad_buf( );
    if (Debug) printf( "Allocated memory OK.\n" );
    return NoError;
}
int OpenOutputAndWriteHeader( )
//
//  EFFECTS     : Open the Amorph output graphics file and write its header.
//  MODIFIES    : creates output file stream object for Amorph output file.
//                ofsPtr points to the Amorph output file stream object
//  REQUIRES    :
//  RETURNS     : Error code
//  SEE ALSO    : OpenInputsAndReadHeaders
//
{
    // open the output file:
    if (Debug) {
        printf( "\nAbout to open file: %s...\n", amphfile);
        getch( );
    }
    ofsPtr = new ofstream (amphfile, ios::out | ios::binary);
    if (!*ofsPtr) {
        printf( "Unable to open file: %s\n", amphfile );
        printf( "    errno = %i\n", errno );
        CloseInputFiles( );
        return FileOpenError;
    }
    if (Debug) {
        printf( "File: %s opened OK (errno = %i). About to write header ...\n",
amphfile, errno);
        getch( );
    }
    // write the header:
    if (!WriteHeader( *ofsPtr )) {
        CloseAllFiles( );
        printf( "Error writing Header info of file: %s\n", amphfile );
        return FileWriteError;
    }
    if (Debug) {
        printf( "Header written OK (errno = %i).\n", errno );
```

-continued

EXHIBIT A

```
            printf( "    Hit any key...\n" );
            getch( );
        }
        return NoError;
}
int OpenInputsAndReadHeaders( )
//
//      EFFECTS     :   Open each of the input graphics files and read their headers.
//                      Save some info from 1st input file's header (for output header),
//                      do some simple checks on subsequent input files for mismatch.
//                      The input files are each assigned to input file stream objects
//                      in reversed order (i.e., with the first input file assigned
//                      to the last ifs object:
//                      ifsPtr[0]                                points to last input file object
//                      ifsPtr[numView-1]      points to first input file object.)
//      MODIFIES    :   AmorphFileHeader, AmorphHeader, ColorPal,
//                      FileHeader, Header, InputDPI, PrintHeight_inches,
//                      BorderSize, BIS_Width, BIS_Height, BIS_Width_inches, BIS_Height_inches,
//                      NumBlocks, AS_Width, AS_Height,
//                      FS_Width, FS_Height, FS_Width_inches, FS_Height_inches,
//                      InputLineLength, BIS_InputLineLength,
//                      BorderedLineLength, AmorphLineLength, AmorphFileSize,
//                      StretchRatio, ShrinkRatio, BlockLength,
//                      numLinePadBytes, numFilePadBytes, ColorPalSize
//                      InputStream
//                      creates an input file stream object for each input file,
//                      ifsPtr[ ] points to input file stream objects
//      REQUIRES    :   consecutive filenames for BMPs present in working directory
//                      in the form: fname001.bmp , fname002.bmp , fname003.bmp , etc.,
//                      value for NumViews
//      RETURNS     :   Error code
//      SEE ALSO    :   OpenOutputAndWriteHeader
//
{
        Boolean                 ReadOK;
        for ( int ViewCount=0; ViewCount<NumViews; ViewCount++ ) {
            // open an input file and create input file stream object for this file
            //                          (in reverse order -- with last ifs object assigned to
            //                          1st input file):
            sprintf( (infile+InFileNameLen), "%03i.bmp", ViewCount+1 );       // create seq. file name
            if (Debug) {
                printf( "\nAbout to open file: %s...\n", infile);
                getch( );
            }
            ifsPtr[NumViews-ViewCount-1] = new ifstream (infile, ios::in | ios::binary);
            if (!(*ifsPtr[NumViews-ViewCount-1])) {
                // close open files if unable to open this file:
                printf( "Unable to open file: %s\n", infile);
                printf( "    errno = %i\n", errno );
                for ( ViewCount=ViewCount; ViewCount>=1; ViewCount-- )
                    ifsPtr[NumViews-ViewCount] -> close( );
                return FileOpenError;
            }
            if (Debug) {
                printf( "File: %s opened OK (errno = %i). About to read header ...\n", infile, errno);
                getch( );
            }
            // read the input file's header:
            if (ViewCount == 0 )
                // verify, strip and copy info from the header of the 1st file:
                ReadOK = VerifyStripAndCopyHeader (*ifsPtr[NumViews-ViewCount-1]);
            else
                // only verify and strip the headers from the other files:
                ReadOK = VerifyAndStripHeader (*ifsPtr[NumViews-ViewCount-1]);
            if (!ReadOK) {
                // close open files if there was a mismatch or a read error:
                printf( "Wrong file type: %s\n", infile );
                printf( "    errno = %i\n", errno );
                for ( ViewCount=ViewCount; ViewCount>=0; ViewCount-- )
                    ifsPtr[NumViews-ViewCount-1] -> close( );
                return FileTypeError;
            }
```

-continued

EXHIBIT A

```
        if (Debug) printf( "Header of file: %s read OK (errno = %i).\n",
infile, errno);
    }
    return NoError;
}
Boolean GrowFileHandles( )
//
//    EFFECTS    : Grow file handles to make sure we can open enough input files
//                 and output files -- we need to open NumViews+1+4 files
//                 (NumViews input files, plus 1 for output file,
//                 plus 5 for operating system).
//    MODIFIES   :
//    REQUIRES   : value for NumViews
//    RETURNS    : TRUE if it could grow enough handles, FALSE if not
//    SEE ALSO   :
//
{
    int hndl_count;
    hndl_count = _NFILES;
    if (Debug) printf( "Before growing handles, we can open %i files.\n",
hndl_count-3 );
    if ( hndl_count < (NumViews+1+5) ) {
        hndl_count = _grow_handles( (NumViews+1+5) );
    }
    if (Debug) {
        printf( "After growing handles, we can now open %i files.\n",
hndl_count-3 );
        printf( "     Hit any key...\n" );
        getch( );
    }
    if ( hndl_count < (NumView+1+5) ) return FALSE;
    return TRUE;
}
void CreateInFilename( )
//
//    EFFECTS    : Create the file name for the 1st sequentially named input file.
//                 e.g., if InFname (from the command line) was "glo"
//                 then the 1st input file name will be:
//                 infile = "glo001.bmp".
//    MODIFIES   : infile, InFileNameLen
//    REQUIRES   : value for InFname
//    RETURNS    :
//    SEE ALSO   :
//
{
    // initialize length of InFname string = 0:
    InFileNameLen = 0;
    // set InFileNameLen = number of chars in InFname:
    while ( InFname[InFileNameLen++] != '\0' );
    InFileNameLen--;
    // if InFileNameLen is bigger than 5, max out number of chars to 5:
    // if ( InFileNameLen > 5 ) InFileNameLen = 5;
    // fill beginning of infile with the char string;
    for ( int Count=0; Count<InFileNameLen; Count++ )
        infile[Count] = InFname[Count];
        // if less than 5 chars in string,
        //              shift the rest of infile over (including end of string
char):
        if ( InFileNameLen < 5 ) {
            for ( Count=5; count<=12; Count++ ) {
                infile[ Count - (5-InFileNameLen) ) = infile[Count];
            }
        }
    if (Debug) printf( "\n1st sequentially named input file: %s\n", infile );
    return;
}
void Get CommandLineVars(int argc, char * argv[ ])
//
//    EFFECTS    : Gets up to 7 command line variables,
//                 and creates the 1st sequentially named input file.
//    MODIFIES   : InFname, NumViews, PrintWidth_inches, BorderSize_inches,
//                 OutputDPI, LensPitch, NumBlackBorders, Debug,
//                 infile
//    REQUIRES   :
//    RETURNS    :
//    SEE ALSO   :
//
```

-continued

EXHIBIT A

```
{
    if  (argc > 1)
        sscanf(argv[1], "%s", &InFname);
    if  (argc > 2)
        sscanf(argv[2], "%i", &NumViews);
    if  (argc > 3)
        sscanf(argv[3], "%lf", &PrintWidth_inches);
    if  (argc > 4)
        sscanf(argv[4], "%lf", &BorderSize_inches);
    if  (argc > 5)
        sscanf(argv[5], "%i", &OutputDPI);
    if  (argc > 6)
        sscanf(argv[6], "%lf", &LensPitch);
    if  (argc > 7)
        sscanf(argv[7], "%i", &NumBlackBorders);
    if  (argc > 8)
        sscanf(argv[8], "%i", &Debug);
    // create 1st input file name from InFname:
    CreateInFilename( );
    return;
}
int main (int argc, char *argv[ ])
{
    int ErrorCode;
    // print Greeting messages:
    printf( "\n\n" );
    printf( "%s", Greeting );
    printf( "%s", Credit );
    printf( "%s", DateVersion );
    printf( "%s", Copyright );
    printf( "\n\n" );
    // get variables from command line, create 1st sequentially named input
file.
    //          and grow enough handles to open enough input and output files:
    GetCommandLineVars( argc, argv );
    if (NumViews > MAXVIEWS) {
        printf( "NumViews is greater than MAXVIEWS.\n" );
        return FileTypeError;
    }
    if ( !GrowFileHandles( ) ) {
        printf( "Unable to open enough files\n" );
        printf( "     -- try increasing 'FILES = ' in config.sys .\n" );
        return NotEnoughHandles;
    }
    // open each of the input graphics files and read their headers:
    ErrorCode = OpenInputsAndReadHeaders( );
    if (ErrorCode != NoError)
        return ErrorCode;
    // open the Amorph output file and write its header:
    ErrorCode = OpenOutputAndWriteHeader( );
    if (ErrorCode != NoError)
        return ErrorCode;
    // allocate memory for BorderedLines_buf
    //          -- enough to combine 1 line from each input file
    //          (with borders and with line padding)
    //          for AmorphLines_buf (resized, interdigitated version of above
buf)
    //          and for Pad_buf (4 bytes to store padding bytes),
    //          also initialize all Pad_buf bytes to PadByteValue:
    ErrorCode = AllocateMem( );
    if (ErrorCode != NoError)
        return ErrorCode;
    // read a line from each bmp file and combine them in BorderedLines_buf
    //          (adding a border -- black for first 2 files, white for the
rest),
    // then resize and interdigitate into AmorphLines_buf (with line pad bytes),
    // then write this to the Amorph output file,
    // and repeat the above process (a line at a time) until all lines are done
    // and put file pad bytes at end of file:
    ErrorCode = ReadInputLinesAndWriteOutputLine( );
    if (ErrorCode != NoError)
        return ErrorCode;
    // close out all files, free up memory:
    Goodbye( );
    printf( "\nAnamorphically Sized output written to file: %s .\n", amphfile
};
    printf( "     Hit any key.. .\n" );
```

-continued

EXHIBIT A

```
    getch( );
    return NoError; // success
}
```

What is claimed is:

1. A method for making multiple view images for an autostereoscopic display, comprising generating a plurality of intermediate images from a pair of source images, wherein each source image is defined by multiple points each having position and color information associated therewith and a view perspective which is spaced apart from the other image, wherein each of the plurality of intermediate images has a different view perspective between the source images, and wherein each intermediate image is a transformation of the source images based on the position and color information at multiple points of the source images.

2. The method of claim 1, wherein the generating step comprises:
   a. creating a first plurality of control points for a first working area of one source image, each control point having unique position and color information associated therewith,
   b. creating a second plurality of control points for a corresponding second working area of the other source image, each control point having unique position and color information associated therewith,
   c. repeating steps a and b for a plurality of working areas in each source image, and
   d. creating a plurality of transformations of the source images each as a function of the position and color information for each control point.

3. A method for interdigitating multiple view images, wherein each view image is defined by a matrix having rows and columns of pixels, comprising:
   scanning each view image one row at a time;
   storing a pixel from each column in a respective vertical buffer during a scan step, and
   combining the vertical buffers into a single output image.

4. A method for making a panoramagram comprising generating a plurality of intermediate images from a pair of planostereoscopic source images each having position and color information and a view perspective which is spaced apart from the other image, each of the intermediate images having a different view perspective which is between the source images and is a transformation of the source images based on the position and color information of the source images, then interdigitating the intermediate images and the source images to form a single output image having substantially a continuum of views ranging from one source image to the other source image.

5. A method for making a panoramagram, comprising:
   preparing a pair of planostereoscopic source images, namely a left image and right image each having position and color information and a view perspective which is spaced apart from the other image,
   generating a plurality of intermediate images each having a different view perspective which is intermediate to that of the source images and is based on the position and color information from the source images, and
   interdigitating the intermediate images and the source images to create a single output image having substantially a continuum of views ranging from the left image to the right image.

6. The method of claim 5, wherein the generating step comprises:
   a. creating a first plurality of control points for a first working area of one source image, each control point having unique position and color information,
   b. creating a second plurality of control points for a corresponding second working area of the other source image, each control point having unique position and color information,
   c. repeating steps a and b for a plurality of working areas in each source image, and
   d. creating a plurality of intermediate images which are transformations of the source images, each of said transformations being a function of the position and color information for each control point.

7. The method of claim 5, wherein the generating step comprises:
   a. creating a first control point for a first working area of one source image, said first control point having unique position and color information,
   b. creating a last control point for a second working area of the other source image, wherein the second working area of the other source image substantially corresponds in position to the first working area of the one source image, said last control point having unique position and color information,
   c. repeating steps a and b for a plurality of working areas in each source image, and
   d. creating a plurality of intermediate images which are transformations of the source images, each of said transformations being logically related to movement from the first control point to the last control point for each working area.

8. The method of claim 7, wherein each transformation has position and color information which is logically related to the position and color information for each control point in direct proportion to the proximity of each control point to the transformation.

9. The method of claim 5, wherein the interdigitating step comprises:
   extracting a vertical slice from each image,
   aligning each vertical slice, and
   sequentially ordering the vertical slices.

10. The method of claim 9, wherein the extracting step comprises extracting each vertical slice from a corresponding vertical position in each image.

11. The method of claim 9, wherein the extracting step comprises sequentially extracting vertical slices from a selected block of images.

12. A method for making a panoramagram, comprising:
   a. converting each of a pair of planostereoscopic source images, namely a left image and right image, to an RGB format, wherein each source image has a view perspective which is spaced apart from the other source image, b. aligning the source images in a positional sense,
c. shifting the source images relative to each other to achieve a desired parallax between the source images,
d. resizing the source images to have one dimension which is divisible by a desired number of views and another dimension which maintains a desired aspect ratio between the two dimensions,
e. identifying one of the source images as a start frame and the other of the source images as the end frame,
f. selecting the desired number of views,
g. selecting a working area in one of the source images and placing the working area substantially in a center of a working box,
h. creating a plurality of control points disposed around the center of the working box, each of said control points having position and color information,
i. performing steps g and h for the other of the source images,
j. interactively performing steps g through i as required for a plurality of working areas,
k. creating a plurality of synthetic images equal to the desired number of views by morphing the source images using the position and color information from each control point, and
l. interdigitating the synthetic images and the source images to create a single output image having substantially a continuum of views ranging from the left image to the right image.

13. The method of claim 12, wherein the one dimension is integrally divisible by the desired number of views.

14. A autostereoscopic display surface comprising substantially a continuum of perspective views ranging from a first image at one end of the display surface to a second image at another end of the display surface, wherein a plurality of intermediate images are synthetically generated from the first and second images by creating transformations of position and color information from a plurality of control points in corresponding locations on the first and second images, said transformations being directly proportionate to a proximity from each control point.

15. A stereoscopic panoramagram having a display surface and a lenticular screen in intimate juxtaposition therewith, wherein the display surface includes a plurality of columns, each of said columns having a lenticule corresponding thereto, characterized by each of said columns having substantially a continuum of perspective views ranging from a first image at one end of the column to a second image at another end of the column, and wherein a plurality of intermediate images are generated from the first and second images by creating transformations of position and color information from a plurality of control points in corresponding locations on the first and second images, said transformations being directly proportionate to a proximity from each control point.

* * * * *